| United States Patent [19] | [11] Patent Number: 5,021,091 |
| Takarada et al. | [45] Date of Patent: Jun. 4, 1991 |

[54] HARD COATING COMPOSITIONS

[75] Inventors: Mitsuhiko Takarada, Annaka; Kazuharu Sato, Gunma; Kenji Yamamoto; Shigeru Mori, both of Annaka, all of Japan

[73] Assignee: Shin-Etsu Chemical Co., Ltd., Tokyo, Japan

[21] Appl. No.: 465,978

[22] Filed: Jan. 16, 1990

[30] Foreign Application Priority Data

Jan. 18, 1989 [JP] Japan ................................. 1-10393

[51] Int. Cl.$^5$ ..................... C09D 183/6; C09D 7/12; C08J 7/4; G02B 1/10
[52] U.S. Cl. ..................... 106/287.16; 106/287.14; 106/287.17; 106/287.19; 106/442; 106/447; 106/455; 106/490; 524/859; 524/780; 524/783; 524/786
[58] Field of Search ................ 106/287.16, 455, 447, 106/287.14, 490, 442; 524/780, 783, 786, 859

[56] References Cited

U.S. PATENT DOCUMENTS

| 3,986,997 | 10/1976 | Clark et al. | 524/300 |
| 4,394,177 | 7/1983 | Fujioka et al. | 106/287.11 |
| 4,702,773 | 10/1987 | Ashlock et al. | 106/287.16 |

Primary Examiner—William R. Dixon, Jr.
Assistant Examiner—C. Melissa Bonnar
Attorney, Agent, or Firm—Birch, Stewart, Kolasch & Birch

[57] ABSTRACT

A hard coating composition comprising an organic silicon compound and inorganic submicron particles such as silica sol and antimony oxide sol is improved in curing properties and shelf stability by blending aluminum perchlorate as the curing catalyst.

11 Claims, No Drawings

HARD COATING COMPOSITIONS

This invention relates to hard coating compositions suitable for forming a coating layer having mar resistance, high hardness, and chemical resistance, that is, a hard coating film on plastic articles, typically optical articles such as plastic lens.

BACKGROUND OF THE INVENTION

Plastic optical articles are generally characterized by light weight, ease of processing and impact resistance. In the prior art, various coatings were used on such plastic optical articles for the purpose of imparting mar resistance and solvent resistance thereto. One such coating is proposed in Japanese Patent Publication No. 2735/1982 as a composition comprising an epoxy group-containing silicon compound, colloidal silica, and aluminum chelate. This composition has a problem that the coating film can be colored upon curing at high temperatures of 110° C. or higher since the amount of aluminum chelate added is as large as 5 to 10% by weight based on the resin solids. In addition, boiling immersion causes the coating film to lower its hardness and sometimes peel away from the substrate.

Another coating composition is disclosed in Japanese Patent Publication No. 9266/1987 as comprising an epoxy group-containing silicon compound, colloidal silica, and ammonium perchlorate. This coating liquid is unstable and prone to a color change.

Japanese Patent Application Kokai Nos. 30361/1978 and 46502/1985 disclose the use of perchloric acid and magnesium perchlorate as the curing catalyst for similar coating compositions. The strong acidity of these catalysts causes the coating liquids to show a substantial change with the lapse of time. The silanol resulting from hydrolysis of an epoxy group-containing silicon compound can undergo poly-condensation in the presence of these acidic catalysts to soften the cured coating.

Still further coating compositions may be prepared from acidic colloidal silica and an organic silicon compound. The compositions may be cured with phosphoric acid, organic carboxylic acids, chromic acid, bromic acid, perchloric acid, aluminic acid, thiosulfuric acid or salts thereof. These coating liquids are too acidic as pH 1 or 2 and unstable.

SUMMARY OF THE INVENTION

Therefore, an object of the present invention is to provide a hard coating composition which has improved curing properties and shelf stability and which can form a hard coating film having high hardness, mar resistance, solvent resistance, and improved adherence without coloring upon curing.

According to the present invention, there is provided a hard coating composition comprising in admixture, (A) an organic silicon compound of the formula:

wherein $R^1$ is selected from the class consisting of epoxy containing organic groups having 2 to 8 carbon atoms, alkyl groups having 1 to 6 carbon atoms, alkenyl groups having 2 to 6 carbon atoms, halo-alkyl groups having 1 to 6 carbon atoms, and aryl groups having 6 to 10 carbon atoms, $R^2$ is selected from the class consisting of hydrogen, alkyl groups having 1 to 4 carbon atoms, alkoxyalkyl groups having 2 to 8 carbon atoms, and acyl groups, and letter a is equal to 1, 2 or 3, or a partial hydrolysate thereof, (B) inorganic submicron particles, and
(C) aluminum perchlorate.

The inventors have found that by blending aluminum perchlorate in a hard coating composition comprising an organic silicon compound of formula (1) or a partial hydrolysate thereof and inorganic submicron particles such as antimony oxide sol, silica sol, titania sol, and alumina sol, curing of the organic silicon compound can be significantly promoted while minimizing coloring upon curing. The resulting coating film has high hardness, mar resistance, and solvent resistance, that is, improved properties as hard coatings. Particularly when a colloidal oxide which has been treated with a basic material or stabilized under basic conditions as the preferred inorganic submicron particles is reacted with the organic silicon compound, the resulting coating liquid can be neutralized to pH 2 to 6.5 with acidic aluminum perchlorate having high curing ability. The coating liquid is then improved in shelf stability.

DETAILED DESCRIPTION OF THE INVENTION

Component (A) constructing the hard coating composition of the invention is a component contributing to film formation and adsorption of organic dyes. It is an organic silicon compound of the formula:

wherein $R^1$ is selected from the class consisting of epoxy containing organic groups having 2 to 8 carbon atoms, alkyl groups having 1 to 6 carbon atoms, alkenyl groups having 2 to 6 carbon atoms, halo-alkyl groups having 1 to 6 carbon atoms, and aryl groups having 6 to 10 carbon atoms; $R^2$ is selected from the class consisting of hydrogen, alkyl groups having 1 to 4 carbon atoms, alkoxyalkyl groups having 2 to 8 carbon atoms, preferably 2 to 6 carbon atoms, and acyl groups; and letter a is equal to 1, 2 or 3, or a partial hydrolysate thereof. The alkoxyalkyl group represented by $R^2$ has the formula: $R^3OR^4$— wherein $R^3$ is an alkyl group having 1 to 4 carbon atoms and $R^4$ is an alkylene group having 1 to 4 carbon atoms, for example, $CH_3OC_2H_4$, $C_2H_5OC_2H_4$, $C_3H_7OC_2H_4$, and $CH_3OC_3H_6$.

Examples of the substituent represented by $R^1$ in formula (1) include glycidoxypropyl, epoxycyclohexylethyl, methyl, ethyl, propyl, 3-chloropropyl, 3,3,3-trifluoropropyl, vinyl, allyl, butyl, and phenyl groups. Examples of the substituent represented by $R^2$ include a hydrogen atom, methyl, ethyl, propyl, butyl, methoxymethyl, methoxyethyl, ethoxyethyl, acetyl, and propionyl groups.

Illustrative, non-limiting examples of the organic silicon compound of formula (1) include:
3-glycidoxypropyltrimethoxysilane,
3-glycidoxypropyltriethoxysilane,
3-glycidoxypropylmethyldimethoxysilane,
3-glycidoxypropylmethyldiethoxysilane,
2-(3',4'-epoxycyclohexyl)ethyltrimethoxysilane,
2-(3',4'-epoxycyclohexyl)ethyltriethoxysilane,
methyltrimethoxysilane,
methyltriethoxysilane,
vinyltrimethoxysilane, vinyltriethoxysilane,
dimethyldimethoxysilane,
dimethyldiethoxysilane,
vinyltris(2-ethoxyethoxy)silane,
vinylmethyldimethoxysilane,
vinylmethyldiethoxysilane,
phenyltrimethoxysilane,
phenyltriethoxysilane,
phenylmethyldimethoxysilane,
phenylmethyldiethoxysilane,
phenylvinyldimethoxysilane,
phenylvinyldiethoxysilane,
diphenyldimethoxysilane,
diphenyldiethoxysilane, etc.

The organic silicon compounds may be used alone or in admixture of two or more.

The organic silicon compound may be used as such although it may be previously hydrolyzed into a partial hydrolysate which is more preferred as component (A).

Component (A) as described above is generally dissolved in an organic solvent to form a coating composition. Examples of the suitable organic solvent include alcohols such as methanol, ethanol, isopropyl alcohol, (iso)butanol, and diacetone alcohol, ketones such as acetone, methyl ethyl ketone, and methyl isobutyl ketone, esters such as ethyl acetate, (iso)propyl acetate, and (iso)butyl acetate, and cellosolves such as methyl cellosolve, ethyl cellosolve, cellosolve acetate, propyl cellosolve, and butyl cellosolve.

The hard coating composition of the invention may contain an optional component in addition to component (A). The optional component may include 3-methacryloxypropyl trimethoxysilane, 3-methacryloxypropylmethyldimethoxysilane, 3-mercaptopropyltrimethoxysilane, methyl silicate, ethyl silicate, and the like. The optional component may be added in any desired amount, preferably less than 100 parts by weight per 100 parts by weight of the silane of formula (1) or a partial hydrolysate thereof.

Component (B) constructing the hard coating composition of the invention is a submicron particulate inorganic material which contributes to the hardness of the resulting coating film. The submicron particulate inorganic material is preferably selected from antimony oxide sol, silica sol, titania sol, alumina sol, and a mixture of two or more of them. The particles preferably have a particle size of from about 1 to about 200 m$\mu$, more preferably from about 5 to about 100 m$\mu$. Inorganic particles of smaller than 1 m$\mu$ in size would be less effective in increasing the surface hardness of the coating film whereas particles of larger than 200 m$\mu$ would detract from the clarity of the coating film. The refractive index of the coating film can be adjusted in the range between 1.50 and 1.65 so as to match with that of the substrate when antimony oxide sol or titania sol is used as component (B).

For the inorganic submicron particles, commercially available colloidal solutions having inorganic submicron particles dispersed in water or organic solvents may be used. The organic solvents used herein include alcohols such as methanol, ethanol, propanol, isopropyl alcohol, butanol, isobutanol, and diacetone alcohol, cellosolves such as methyl cellosolve, ethyl cellosolve, and butyl cellosolve, and amides such as N,N-dimethylformamide.

Preferably the inorganic submicron particles have been treated with a basic material or stabilized under basic conditions because the coating composition becomes more stable. The basic materials used herein include sodium hydroxide, sodium oxide, potassium hydroxide, sodium carbonate, sodium hydrogen carbonate, triethylamine, tributylamine, ammonia, triethanolamine, tributanolamine and the like. These treatments may be effected by adjusting the pH of the sol solution to the range between 6 and 9. These treatments include neutralizing commercially available ordinary hydrochloric acid-acidified sols (pH 2-5) with the above-mentioned basic materials; hydrolyzing metal alkoxides in the presence of acidic catalysts such as hydrochloric acid, phosphoric acid, acetic acid, methanesulfonic acid, p-toluenesulfonic acid, and sulfuric acid and neutralizing the resulting sols with the above-mentioned basic materials to pH 6-9; and neutralizing sodium salts (e.g., sodium silicate) with hydrochloric acid to form metal oxide sols stable at pH 6-9. Examples of the inorganic submicron particles which have been treated with a basic material or stabilized under basic conditions include an antimony oxide sol obtained by treating sodium antimonate with hydrochloric acid and neutralizing the resulting agglomerate with triethanol amine, as well as a silica sol which is stabilized to a weak basicity with residual sodium oxide. More particularly, the antimony oxide sol is obtained by treating sodium antimonate ($Na_2O.Sb_2O_5.6H_2O$) with hydrochloric acid at pH 1 or lower, adding water and triethanolamine to the resulting slurry, and heating the slurry into a colloidal sol which is stable at pH 6-8.

The amount of component (B) blended preferably ranges from 5 to 200 parts by weight, more preferably from 20 to 150 parts by weight per 100 parts by weight of component (A), provided that component (B) is calculated as inorganic submicron particle solids. Less than 5 parts by weight of component (B) is less desirable in forming a fully hard coating whereas more than 200 parts by weight of component (B) is likely to form a brittle coating having a poor covering power.

Component (C) is a curing catalyst for curing a mixture of components (A) and (B). According to the present invention, aluminum perchlorate is used for the stability of the coating composition as well as the hardness, anti-yellowing, moisture resistance, and curing properties of the resulting hard coating film. The aluminum perchlorate may be selected from commercially available ones in any desired form including hydrate and partial hydroxide forms. One preferred form is the hexahydrate $Al(ClO_4)_3.6H_2O$.

The amount of component (C) or aluminum perchlorate added is an effective amount to adjust the coating composition to pH 2 to 6.5, more preferably 3 to 5 so that the composition may be improved in shelf stability. Preferably $Al(ClO_4)_3.6H_2O$ is added in such an amount as to adjust the coating composition to pH 2.5 to 5.5 because the silanol is stabilized. The effective amount preferably ranges from 0.1 to 10 parts by weight, more preferably from 0.2 to 5 parts by weight per 100 parts by weight of component (A). Less than 0.1 part by weight of aluminum perchlorate would be too small to promote the curing of a coating composition whereas the presence of more than 10 parts by weight of aluminum perchlorate would render the coating composition too acidic to below pH 2 to maintain the composition stable.

Any of various well-known additives may be added to the hard coating composition of the invention for the purposes of increasing the adhesion of the composition to substrates such as plastics and improving the weatherability, applicability, and glare protection of the composition. Examples of the useful additives which can be blended in the hard coating composition include epoxy resins, for example, polyolefinic epoxy resins, cyclohexene oxide, polyglycidyl esters, polycondensates of epichlorohydrin and bisphenol-A, and copolymers of glycidyl methacrylate and an acrylic compound in amounts of up to 30 parts by weight per 100 parts by weight of component (A). Addition of more than 30 parts of epoxy resin will result in a soft coating having substantially reduced weatherability. UV absorbers such as benzophenones, benzotriazoles, and phenols may be blended in the composition in amounts of up to 20 parts by weight per 100 parts by weight of component (A). Addition of more than 20 parts of UV absorbers will reduce the hardness of the coating. Various surface-active agents may also be blended in the composition in amounts of up to 10 parts by weight per 100 parts by weight of component (A) for the purpose of improving the applicability thereof, for example, block and graft copolymers of dimethylsiloxane and polyether, and fluoride surface-active agents. Addition of more than 10 parts of surface-active agent will adversely affect the adherence of the coating to a substrate.

The hard coating composition of the invention may be prepared by mixing components (A) and (B) and an optional additive or additives, aging the mixture, and then adding component (C) to the mixture. Particularly when it is desired to use a partial hydrolysate of an organic silicon compound as component (A), the composition is prepared by first adding pure water or an acidic aqueous solution of hydrochloric acid or acetic acid to monomeric component (A) in admixture with an optional additive or additives for hydrolysis, and then adding components (B) and (C) to the partial hydrolysate. It is also possible to utilize the basic material often available along with component (B) for the hydrolysis of component (A).

The hard coating composition of the invention may be based on a solvent, for example, alcohols, ketones, esters, and cellosolves, preferably lower alcohols such as methanol, ethanol, isopropanol, butanol, isobutanol, and diacetone alcohol, and cellosolves such as methyl cellosolve, ethyl cellosolve, cellosolve acetate, and butyl cellosolve. Also useful are mixtures of these solvents with other ester, ketone, and aromatic solvents. Examples of the ester solvent include ethyl acetate, (iso)propyl acetate, and (iso)butyl acetate, examples of the ketone solvent include acetone, methyl ethyl ketone, and methyl isobutyl ketone, and examples of the aromatic solvent include benzene, toluene, xylene, and ethylbenzene.

The hard coating composition of the invention may be advantageously applied to various plastic materials as well as other substrates. The plastic materials to which the composition is applicable are not particularly limited. Better results are obtained when it is applied to polymethyl methacrylate, polycarbonate, polystyrene, polyesters, modified acrylic resins, diethylene glycol bisallylcarbonate (trade name: CR-39), and urethane resins, to name a few. The hard coating composition of the invention may be applied to a plastic material substrate, typically plastic optical article and heat treated into a protective coating film having a high hardness. It may be applied by any desired conventional techniques including brush coating, roll coating, spray coating, flow coating, dipping, and spin coating. The curing conditions will vary with the amount of curing catalyst blended and other factors. Usually, a cured coating film can be obtained by heating the coating to a temperature below the softening point of the plastic substrate, typically 80° to 150° C. for about ½ to about 5 hours.

The cured coating film resulting from the composition of the invention may be dyed with disperse dyes. For a particular disperse dye, dyeing conditions including the concentration, temperature, and time may be determined without undue experimentation. In general, the coating film is dyed by immersing in a dye bath containing about 0.1 to 1% by weight of a dye in water at about 80° to 100° C. for about 5 to 15 minutes.

EXAMPLE

Examples of the present invention are given below by way of illustration and not by way of limitation.

EXAMPLES 1-3

Into a flask were admitted 100 grams of 3-glycidoxypropyltrimethoxysilane, 125 grams of 3-glycidoxypropylmethyldiethoxysilane, and 80 grams of isobutyl alcohol. With stirring under ice cooling, 38 grams of 0.05N dilute hydrochloric acid water was added dropwise over 30 minutes. After 300 grams of inorganic submicron particles shown in Table 1 (a water or methanol dispersion having 30% by weight of non-volatile values) were added to the mixture, the mixture was aged for 16 hours at 20° C. Then 50 grams of ethanol and 70 grams of ethyl cellosolve were added to the mixture, and aluminum perchlorate hexahydrate was finally added in the amount shown in Table 1, obtaining a coating liquid. This coating liquid was applied to an alkali treated plastic lens of CR-39 by dipping and then cured at 120° C. for 60 minutes.

For comparison purposes, coating liquids were prepared by the same procedure as above except that aluminum acetyl acetonate and ammonium perchlorate were used instead of the aluminum perchlorate. They were applied and cured to plastic lens by the same procedure as above.

The hard coating films obtained were examined by the following methods. Separately, the respective coating liquids were examined for shelf stability by the following method.

Shelf Stability

The coating liquid was shelf stored for one month at 25° C. The shelf stability was evaluated in terms of a change of viscosity before and after shelf storage.

Mar Resistance

The coating was rubbed 10 strokes with #000 steel wool under a load of 500 grams and visually examined for mars.

Adhesion

A scribed adhesion test was carried out according to JIS K-5400, item 6.15. The coating was scribed with a knife to form a grid of 11 horizontal cuts and 11 vertical cuts all spaced 1 mm. An adhesive tape (manufactured by Nichiban K.K.) was applied and stripped to and from the scribed area. The number of remaining sections was counted.

Solvent Resistance

The coating was lightly wiped 100 times with acetone-impregnated absorbent cotton and visually examined for clarity.

Coloring

The cured coating was visually examined for color.

Dyeability

The CR-39 lens having the coating applied thereon was immersed for 5 minutes in an aqueous solution containing 0.2% by weight of disperse dye Brown D (manufactured by Seiko K.K.) at 86° C. The light transmittance of the lens was measured.

Dyeability After Aging

The coating liquid was shelf stored for one month at 25° C. before it was applied and cured to CR-39 lens. The coated lens was tested in the same manner as the "Dyeability" test.

TABLE 1

|  | Example 1 | Example 2 | Example 3 | Comparative Example 1 | Comparative Example 2 |
| --- | --- | --- | --- | --- | --- |
| Components | | | | | |
| Submicron particles | $Sb_2O_5$*1 | $Sb_2O_5$*1 | $SiO_2$*2 | $SiO_2$*3 | $SiO_2$*3 |
| Curing catalyst | | $Al(ClO_4)_3 \cdot 6H_2O$ | | $Al(acac)_3$*4 | $NH_4ClO_4$ |
| Amount (g) | 8 | 2 | 8 | 15 | 3 |
| Coating Liquid | | | | | |
| pH | 3.0 | 6.0 | 3.0 | 3.5 | 3.0 |
| Shelf stability | no change | no change | no change | slightly thickened | slightly thickened |
| Coating Film | | | | | |
| Refractive index @ 25° C. | 1.58 | 1.58 | 1.48 | 1.48 | 1.48 |
| Mar resistance | OK | OK | OK | OK | OK |
| Adhesion | 100/100 | 100/100 | 100/100 | 100/100 | 100/100 |
| Solvent resistance | OK | OK | OK | OK | OK |
| Coloring | OK | OK | OK | yellowed | yellowed |
| Dyeability (%) | 88 | 85 | 82 | 85 | 89 |
| Dyeability after aging (%) | 83 | 76 | 56 | 71 | 68 |

*1 sol treated with 2% by weight of triethanol amine (methanol solution)
*2 sol having 0.3% by weight of $Na_2O$ left therein (aqueous solution at pH 9)
*3 acidic methanol silica sol (methanol solution at pH 3)
*4 aluminum acetylacetonate There has been described a hard coating composition which has improved curing properties and shelf stability. The composition is cured into a hard coating film having high hardness, mar resistance, and solvent resistance. The film firmly bonds to the underlying material and undergoes no yellowing. The refractive index of the coating film can be adjusted in the range between 1.50 and 1.65 so as to match with that of the substrate when antimony oxide sol or titania sol is used as component (B), allowing the coating film to cover various substrates having different refractive indexes without producing an interference band.

Although some preferred embodiments have been described, many modifications and variations may be made thereto in the light of the above teachings. It is therefore to be understood that within the scope of the appended claims, the invention may be practiced otherwise than as specifically described.

We claim:

1. A hard coating composition comprising in admixture, (A) an organic silicon compound of the formula:

$$R^1_a Si(OR^2)_{4-a}$$

wherein $R^1$ is selected from the class consisting of epoxy containing organic groups having 2 to 8 carbon atoms, alkyl groups having 1 to 6 carbon atoms, alkenyl groups having 2 to 6 carbon atoms, halo-alkyl groups having 1 to 6 carbon atoms, and aryl groups having 6 to 10 carbon atoms, $R^2$ is selected from the class consisting of hydrogen, alkyl groups having 1 to 4 carbon atoms, alkoxyalkyl groups having 2 to 8 carbon atoms, and acyl groups, and letter a is equal to 1, 2 or 3, or a partial hydrolysate thereof, (B) inorganic submicron particles, and (C) aluminum perchlorate.

2. The composition of claim 1 wherein said inorganic submicron particles are of antimony oxide sol, silica sol, titania sol or alumina sol.

3. The composition of claim 1 wherein said inorganic submicron particles are of antimony oxide sol, silica sol, titania sol or alumina sol which has been treated with a basic material or stabilized under basic conditions.

4. The composition of claim 3 wherein the pH of said sol is in the range of from 6 to 9.

5. The composition of claim 1 wherein aluminum perchlorate (C) is $Al(ClO_4)_3 \cdot 6H_2O$.

6. The composition of claim 1 wherein aluminum perchlorate (C) is present in an effective amount to adjust the composition to pH 2 to 6.5.

7. The composition of claim 5 wherein $Al(ClO_4)_3 \cdot 6H_2O$ is present in an effective amount to adjust the composition to pH 2.5 to 5.5.

8. The composition of claim 1 comprising 100 parts by weight of component (A), 5 to 200 parts by weight of component (B), and 0.1 to 10 parts by weight of component (C).

9. The composition of claim 1, wherein $R^1$ is selected from the group consisting of:
glycidoxypropyl, epoxycyclohexylethyl, methyl, ethyl, propyl, vinyl, allyl, butyl, and phenyl.

10. The composition of claim 1, wherein $R^2$ is selected from the group consisting of:
a hydrogen atom, methyl, ethyl, propyl, butyl, methoxymethyl, methoxyethyl, ethoxyethyl, acetyl and propionyl.

11. The composition of claim 1, wherein component (A) is selected from the group consisting of:
3-glycidoxypropyltrimethoxysilane,
3-glycidoxypropyltriethoxysilane,
3-glycidoxypropylmethyldimethoxysilane, 3-glycidoxypropylmethyldiethoxysilane,
2-(3′,4′-epoxycyclohexyl)ethyltrimethoxysilane,
2-(3′,4′-epoxycyclohexyl)ethyltriethoxysilane,
methyltrimethoxysilane,
methyltriethoxysilane,
vinyltrimethoxysilane,
vinyltriethoxysilane,
dimethyldimethoxysilane,
dimethyldiethoxysilane,
vinyltris(2-ethoxyethoxy)silane,
vinylmethyldimethoxysilane,
vinylmethyldiethoxysilane,
phenyltrimethoxysilane,
phenyltriethoxysilane,
phenylmethyldimethoxysilane,
phenylmethyldiethoxysilane,
phenylvinyldimethoxysilane,
phenylvinyldiethoxysilane,
diphenyldimethoxysilane, and
diphenyldiethoxysilane.

* * * * *